June 8, 1926.

E. T. SMITH 1,587,869

POWER UNIT FOR GATE VALVES

Filed July 11, 1921    3 Sheets-Sheet 1

INVENTOR
Emory T. Smith
BY Chapin & Neal
ATTORNEYS.

June 8, 1926.
E. T. SMITH
1,587,869
POWER UNIT FOR GATE VALVES
Filed July 11, 1921  3 Sheets-Sheet 2
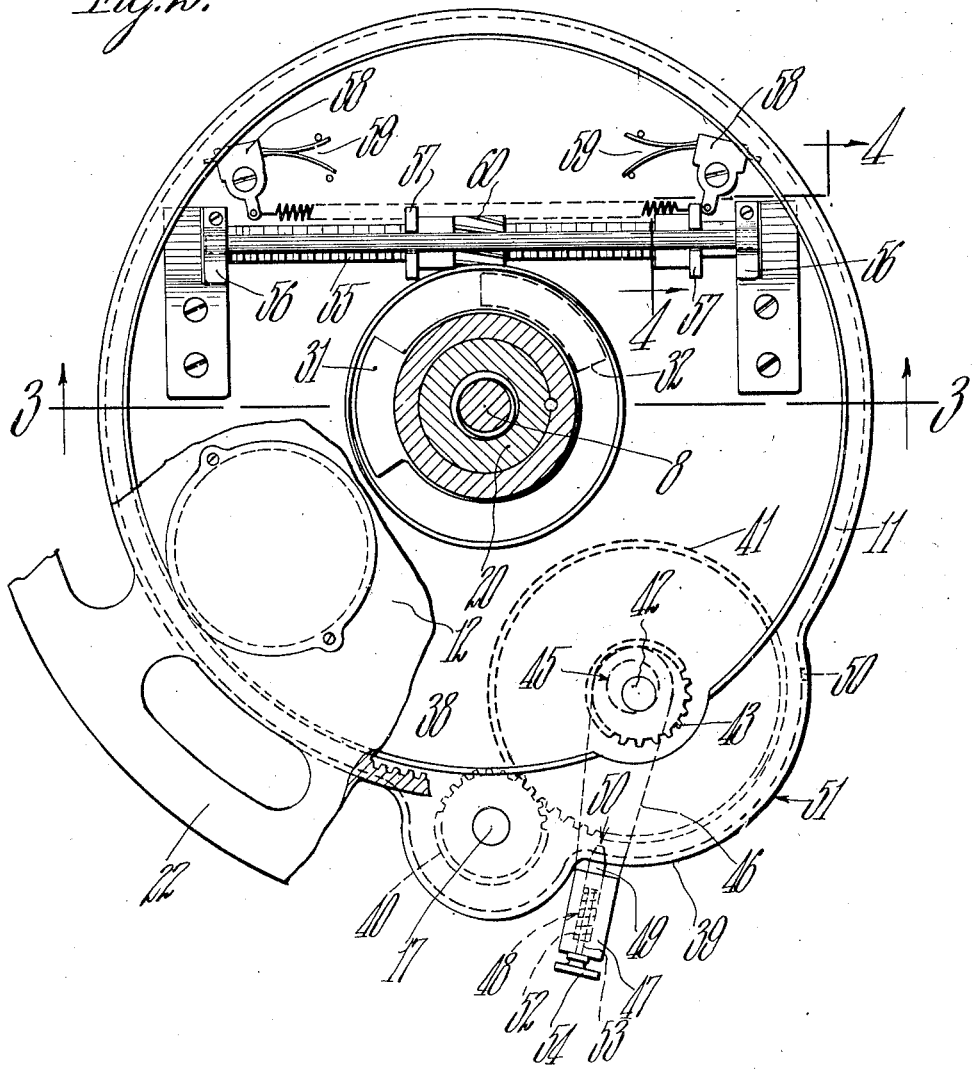
INVENTOR
Emory T. Smith
BY Chapin & Neal
ATTORNEYS.

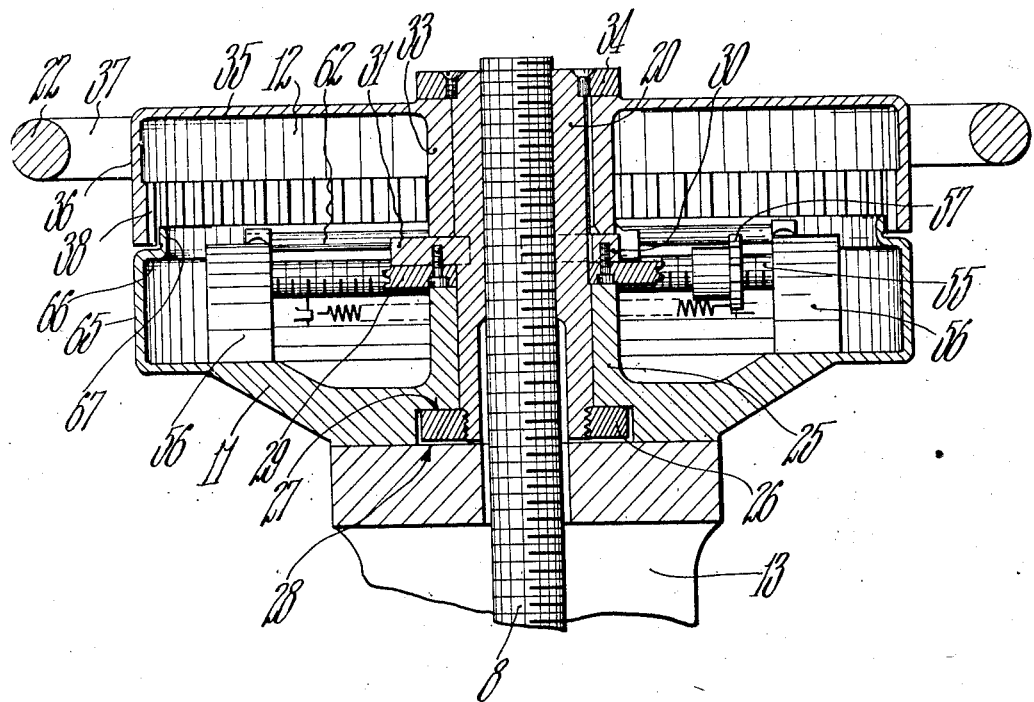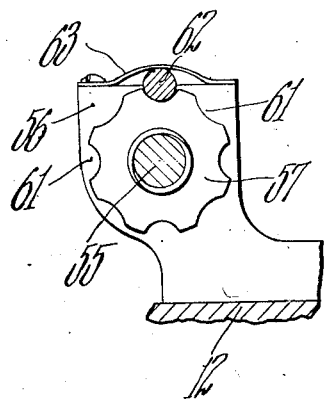

Patented June 8, 1926.

1,587,869

UNITED STATES PATENT OFFICE.

EMORY T. SMITH, OF LUDLOW, MASSACHUSETTS, ASSIGNOR TO CHAPMAN VALVE MANUFACTURING COMPANY, OF INDIAN ORCHARD, MASSACHUSETTS, A CORPORATION OF MASSACHUSETTS.

POWER UNIT FOR GATE VALVES.

Application filed July 17, 1921. Serial No. 483,865.

The present invention relates to power units and more particularly to a motor-driven power unit for operating gate-valves.

One of the primary objects of the invention is to provide a power unit of simple and rugged construction, having its parts compactly arranged and adapted to be disconnected at will from the source of power and operated manually, and to provide novel and adequate means for housing various parts of the device to protect them from dust or injury and prevent them from injuring the operator.

Among the more important objects and features of this invention are: the embodiment in a unit structure of means for operating various types, arrangements and sizes of valves and other mechanisms; the embodiment in a structure of means whereby the valve, or the like, may be operated manually or by other power; the arrangement of the manual and power actuated driving means wherein a motor, limit control means therefor, and manual means are all embodied in a structure which is compact, possesses strength and rigidity, and as a complete power transmission unit may be associated with any one of various types of valves, whether rotary or reciprocable without material modification of the valve or other structure; the complete housing of the power transmission mechanism to protect the same against damage and the operator against injury; the facility with which the various parts of the device may be reached for repair or replacement; the embodiment in a device of this character of an arrangement whereby assembly and disassembly of the parts may be quickly and facilely accomplished; and the novel means for operatively connecting the motor and transmission mechanism or for disconnecting the same, and for indicating the condition of such connection whereby the valve or other device may be manually operated when necessary or desirable independently of the motor and its associated driving elements.

Additional objects and features of utility and improvement reside in the particular embodiment illustrated and are: the mounting of the motor externally of the other parts of the device yet upon the support for the same whereby the motor, while not destroying the unity of the structure, is rendered readily accessible for repair or removal in order to reduce to a minimum the period of retirement of the valve or other device from service when repairs are required; the generally dust-proof casing for the power transmission means and associated parts; the simplicity of the control for effecting connection and disconnection of the motor to the transmission means; and the generally new functions performed by the device developing from the improved form of lost motion connection between the transmission mechanism and the driven element whereby the motor is permitted to get up to speed before having the load placed thereon.

The foregoing, as well as such further objects and additional benefits and advantages as may hereinafter appear or be pointed out, I attain by means of a construction, one embodiment of which is illustrated in the accompanying drawings wherein:

Fig. 2 is a view, partially in plan and partially in horizontal section, of the power unit shown in Fig. 1, the section being taken substantially on the line 2—2 of Figure 1:

Fig. 3 is a view in central vertical section of the power unit; and

Fig. 4 is a detail sectional view taken on the line 4—4 of Fig. 2.

Figure 1:
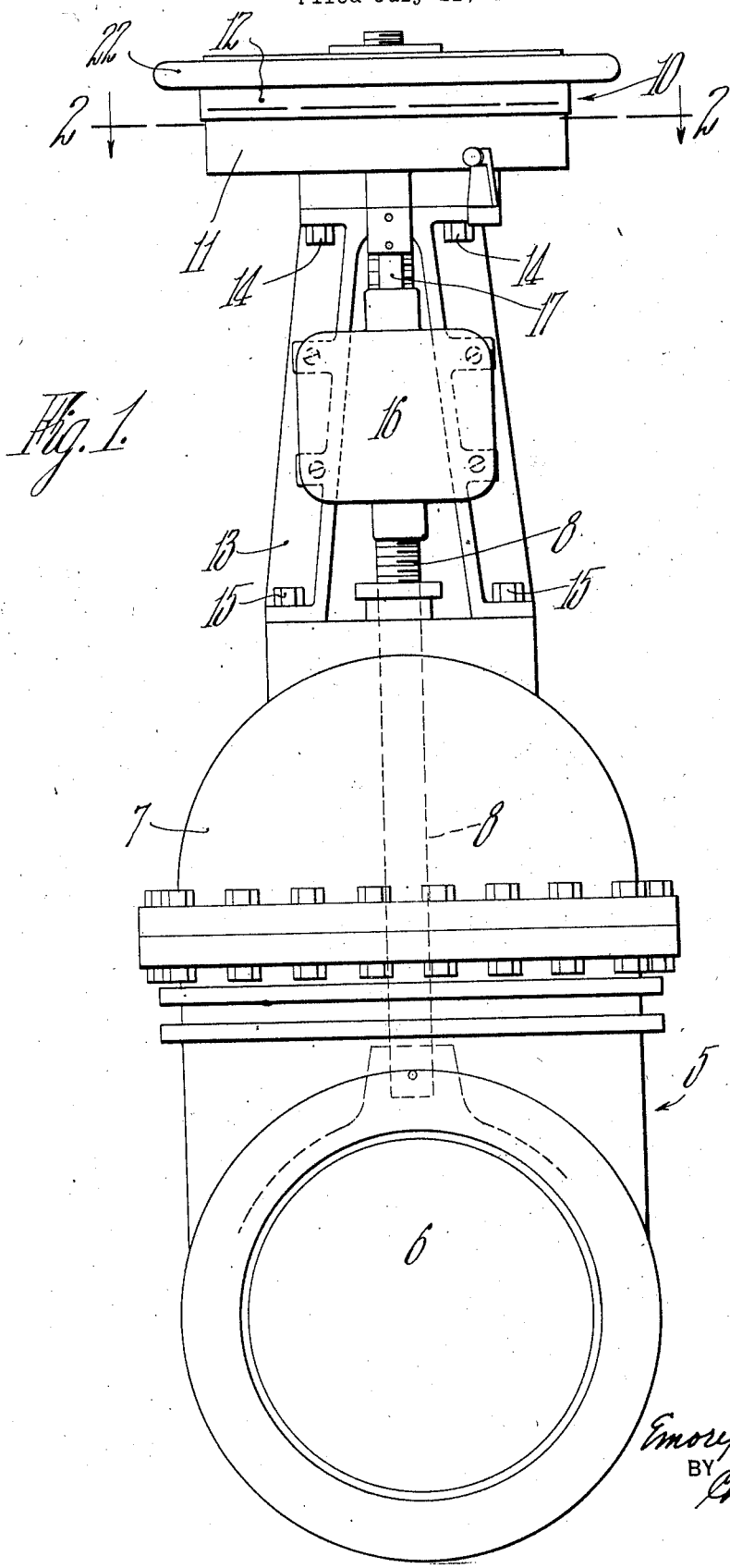
Fig. 1 is a front elevational view of the improved power unit applied to a gate valve of a well known type.

Referring to Fig. 1 of the drawings, a gate valve is indicated at 5, the valve being illustrative of one of various types which it is desirable to operate by power and to which the present power unit is adapted to be applied. In the valve shown, the valve closure or gate 6 is movable vertically within an upright casing 7 to open and close the valve. The valve gate 6 is secured to the lower end of a non-rotatable vertical spindle 8, the upper portion of which is screwthreaded and projects above the valve casing. The valve spindle 8 is adapted to be raised or lowered to operate the valve by means of a power unit 10, which embodies a preferred form of the present invention and surrounds the upper portion of the valve spindle.

The power unit 10 is entirely enclosed within a housing comprising a lower stationary housing member 11 and an upper rotatable housing member 12. The lower housing member 11 is supported above the valve casing by means of a frame or standard 13, this member being secured by bolts 14 to the upper portion of the frame 13 while the lower extremities of the frame are secured by bolts 15 to the top of the valve casing. A reversing motor 16 is provided for driving the power unit. As shown, the motor is rigidly fastened to the supporting frame 13, at one side thereof, and is arranged with its armature shaft 17 vertically disposed and extending upwardly into the lower housing member 11 of the power unit. The valve spindle 8 is raised and lowered to operate the valve by the rotation of a vertically immovable sleeve or nut 20 (Fig. 3) which is threaded upon the spindle and constitutes a portion of the power unit. The sleeve 20 is adapted to be rotated from the motor shaft 17 through the agency of interposed speed reduction gearing shortly to be described. To permit manual operation of the valve, a hand-wheel 22 is mounted upon the sleeve 20, above the lower housing member 11, and provision is made for disconnecting the sleeve from the motor shaft 17. The hand-wheel 22 is formed integrally with the upper housing member 12, the latter cooperating with the lower housing member 11 to entirely enclose the component parts of the power unit. When the sleeve 20 is connected with the motor shaft 17, the hand wheel 22 and the upper housing member 12 that is formed integrally therewith are rotated through the agency of the reduction gearing above referred to and thus serve as the medium for transmitting rotation to the sleeve 20.

The sleeve 20 is journaled within a bearing hub 25 which rises from the bottom wall of the lower housing member 11 and surrounds the lower portion of the sleeve. To prevent upward longitudinal movement of the sleeve 20, a collar 26 is threaded upon the lower end thereof to engage an annular shoulder 27 formed at the base of a recess 28 that is counterbored in the bottom of the lower housing member 11. Downward movement of the sleeve 20 is prevented by the engagement with the upper end of the bearing hub 25, of the lower face of a horizontal worm or spiral gear 29 that is rigidly secured to an annular flange 30 projecting from the middle of the sleeve 20, the worm 29 performing a function to be hereafter explained.

The sleeve 20 and the hand wheel 22 are adapted to be operatively connected by means permitting the occurrence of lost motion between said parts. To this end a lug or abutment 31 (Figs. 2 and 3) extends outwardly from the annular flange 30 at one side of the sleeve and the hand wheel is mounted to turn on the sleeve and is provided with an abutment 32 for cooperatively engaging the abutment 31. For this purpose the abutment 32 is offset below the hub 33 of the hand-wheel so as to lie in the horizontal plane of the abutment 31. With this construction, while the lost motion between the abutments 31 and 32 is being taken up by the idle rotation of the hand wheel under power, the motor is enabled to get up considerable speed so that the abutment on the hand-wheel finally delivers a sudden and heavy blow to the abutment on the sleeve 20 thus insuring the unseating of the valve gate. As shown in Fig. 3, the hand-wheel is confined between the flange 30 on the sleeve 20 and a collar 34 which is rigidly secured to the upper portion of the sleeve and engages the upper end of the hub of the hand-wheel.

The upper housing member 12 which is integral with the hand-wheel is of an inverted dish-like shape, as shown in Fig. 3, comprises a horizontal portion 35 radiating from the hub and having a circular margin concentric with the axis of the valve spindle, and a vertical flange 36 depending from said margin. The rim of the upper housing member 12 encircles the flange and is connected therewith by means of a series of short spokes 37. The lower portion of the vertical flange 36 is provided upon its inner face with gear teeth arranged to constitute an annular gear 38, said gear being driven by the reduction gearing of the power unit.

As shown in Fig. 2, the reduction gearing, already referred to, comprises a driving pinion 40, secured to the upper end of the motor shaft 17; a gear 41 normally intermeshing with the pinion 40 and rotatably mounted upon a bearing stud 42; and a pinion 43, which is compounded with the gear 41 and normally meshes with the annular gear 38 carried by the hand-wheel. The housing 11 is extended, as indicated at 39, to surround the portions of the reduction gearing which extend outwardly beyond the annular gear 38. To permit the motor to be disconnected from the sleeve 20 so as to leave the latter free to be turned by manual operation of the hand-wheel, the bearing stud 42 is provided with an eccentric lower portion 45 which extends through and is adapted to turn in a bearing in the bottom of the lower housing member 11, and means is provided for turning said bearing stud so as to shift the compounded gear and pinion 41 and 43 inwardly out of intermeshing engagement with the driving pinion 40 and the annular gear 38, respectively. The means for thus turning the bearing stud 42 consists of a horizontal arm 46 which is rigidly fastened to the lower end of the eccentric portion of the bearing stud that projects below the housing member 11. To hold the pinion 43 and gear 41 in both their operative and idle positions, the arm 46 is provided, at its free extremities, with an upstanding lug 47. The lug 47 is bored in a direction parallel to the length of the arm 46 to provide a recess 48 for the reception of a detent 49 which is adapted to engage in one or the other of two notches 50 formed in the segmental face 51 of the housing extension 39 which is adjacent the gear 41. A coiled spring 52 is seated in the recess 48, behind the detent 49, and constantly urges the detent toward the segmental face 51 and causes it to enter one or the other of the notches 50 when brought into registry therewith. To permit the detent 49 to be readily withdrawn from the notches with which it may be engaged, a tail rod 53 extends outwardly from the detent, through the outer end of the lug 47 and the free extremity of the tail rod is provided with a finger button 54 by which the detent may be shifted by the operator.

To insure the stopping of the motor 16 when the valve gate has reached the limit of its movement in either direction, a limit switch is provided for automatically making and breaking the necessary contacts in the motor circuits. The limit switch may be of any standard type suitable for the purpose set forth, and inasmuch as the use of a limit switch is well known in the art it is not considered necessary to illustrate the motor operating circuits in the drawings. Briefly described, the limit switch comprises the usual screw-threaded switch spindle 55 which is located at the opposite side of the valve spindle from the motor. The switch spindle 55 is journaled in bearing brackets 56 and carries two traveling nuts 57. The nuts 57 are adapted to engage projections on two swivel blocks 58 which carry the contact making and breaking switch members 59. In accordance with the present invention, the switch spindle 55 is rotated by spiral or worm gearing comprising a gear 60 secured to the switch spindle and the gear 29 hereinbefore referred to, which is fast upon the valve spindle actuating sleeve 20. For the purpose of varying the distance travelled by the valve gate 6 in either direction, the nuts 57 may be adjusted by turning them upon the switch spindle. To retain the nuts 57 in adjusted position, the margins thereof, which are circular in contour, are provided with a plurality of segmental notches 61 (Fig. 4) which are adapted to be engaged by a horizontal rod 62 which extends above the switch spindle from one bearing bracket 56 to the other and is yieldingly held in engagement with the notched portions of the nuts 57 by leaf springs 63 the latter being secured to said bearing blocks and pressing downwardly upon the opposite ends of the rod 62. By lifting the rod 62 out of the notches which it engages in the nuts 57, the latter may be turned readily and a fine degree of adjustment obtained whereby the valve spindle gate may be stopped at any desired point in its path of travel.

Referring to Fig. 3, it will be seen that the lower housing member 11 is provided with a vertical annular wall 65 which is disposed in alinement with the annular flange 36 of the dishlike upper housing member 11 and that the lower edge of the flange 36 and the upper marginal portion of the housing wall 65 are arranged closely adjacent each other so that the upper and lower housing members cooperate to entirely enclose the component parts of the power unit and associated mechanism. To prevent the entrance of dust or foreign matter through the clearance space between the hand-wheel flange 36 and the housing wall 65, the latter is provided at its upper end with an inwardly turned annular flange 66 and an annular flange 67 which is turned upwardly from the inner edge of the flange 66. The upwardly turned flange 67 telescopes within the toothed face of the hand-wheel flange 36, as shown, and acts to prevent any matter which may enter between the flange 66 and the adjacent edge of the hand-wheel flange 36 and the adjacent edge of the hand-wheel 36 from reaching the interior of the housing. By means of the cooperation of the upper and lower housing members 11 and 12, not only is the mechanism of the power unit adequately protected from dust and injury but the operator is protected from possible injury by coming in contact with the gearing of the power unit. Furthermore, the provision of an external motor and its mounting affords economy in space, and at the same time renders the motor readily accessible for repairs or replacements without the necessity of taking down the entire valve, thereby increasing the period of usefulness of the valve, as the valve may be manually operated during repairs or replacement of the motor.

What is claimed is:—

1. A power transmission unit having, in combination, a driving shaft, a rotary driven member, means for rotating said member including a housing member carried thereby forming manually operating means therefor having gear teeth upon its interior, reduction gearing disconnectibly connecting said shaft and said gear teeth and a second housing member cooperating with said geared housing member to entirely enclose said reduction gearing.

2. A power transmission unit having, in combination a driving shaft, a rotary driven member, means for rotating said member comprising a rotatable housing member consisting of a gear wheel having a hub carried by said driven member and a continuous web extending outwardly from one end of the hub, said web terminating in an annular flange projecting from the same side thereof as the hub and provided with internal gear teeth, reduction gearing connecting the driving shaft and said gear wheel and a stationary housing member cooperating with said rotatable housing member to entirely enclose the reduction gearing, said stationary housing member having an annular shoulder arranged immediately adjacent the free edge of said annular flange and an annular lip telescoping within the toothed face of the annular flange of the rotatable housing member.

3. A power transmission unit comprising, in combination, a rotary driven member, means for rotating said member including a housing member carried thereby forming manual operating means therefor having gear teeth upon its interior, a driving shaft adjacent to said housing member, reduction gearing disconnectibly connecting said driving shaft and said gear teeth, and a second housing member cooperating with said geared housing to entirely enclose said reduction gearing and to support said driving shaft.

4. A power unit for gate valves having, in combination, a valve spindle, a rotary member for actuating the spindle, means including a hand-wheel for actuating said rotary member, a motor for actuating the hand-wheel, reduction gearing between the motor shaft and the hand-wheel including an annular gear carried at one side of the hand-wheel and provided with internal gear teeth, and a stationary housing member cooperating with the hand-wheel and said annular gear to form a casing entirely enclosing said rotary member and the rest of the reduction gearing.

5. A power unit for gate valves having, in combination a rotatable member connected to actuate the valve, driving means for said member including a housing member carried thereby, an annular gear constituting one side of said housing member and provided with internal gear teeth, a motor for driving said gear, a support for said motor, a second housing secured to said support, reduction gearing between the motor shaft and the first housing member comprising a driving pinion on said shaft, a gear meshing with said pinion, a bearing stud eccentrically mounted to turn in the second housing member, a gear mounted upon said stud and meshing with said pinion, a pinion compounded with said gear and meshing with said annular gear, and means for turning said bearing stud to move said compounded gear and pinion out of mesh with the gears respectively engaged thereby.

6. A power unit for gate valves having, in combination a rotatable member connected to actuate the valve, driving means for said member including a housing member carried thereby, an annular gear constituting one side of said housing member and provided with internal gear teeth, a motor for driving said gear, a support for said motor, a second housing secured to said support, reduction gearing between the motor shaft and the first housing member comprising a driving pinion on said shaft, a gear meshing with said pinion, a bearing stud eccentrically mounted to turn in the second housing member, a gear mounted upon said stud and meshing with said pinion, a pinion compounded with said gear and meshing with said annular gear, and means for turning said bearing stud to move said compounded gear pinion out of mesh with the gears respectively engaged thereby and means for maintaining said gear and pinion in operative and inoperative positions.

7. A power unit for gate valves having, in combination, a non-rotatable screw-threaded valve spindle adapted for longitudinal movement in opposite directions, a longitudinally immovable sleeve threaded upon the valve stem, a hand-wheel mounted to turn upon said sleeve, lost motion connections between the hand-wheel and the sleeve through which the latter may be rotated by the former, a reversing motor for turning the hand-wheel in opposite directions to open or close the valve, a support for the motor, reduction gearing adapted to be rendered operative to transmit the rotation of the motor shaft to the hand-wheel said gearing including an annular gear wheel carried at one side of the hand-wheel and a housing member secured to the motor support within which the reduction gearing and limit switch are mounted, said housing member and said hand-wheel together with the annular gear carried thereby being constructed and arranged to cooperate to entirely enclose the parts mounted therewithin.

8. A power unit for gate valves having, in combination, a non-rotatable screw-threaded valve spindle adapted for longitudinal movement in opposite directions, a longitudinally immovable sleeve threaded upon the valve stem, a hand-wheel mounted to turn upon said sleeve, a reversing motor for turning the hand-wheel in opposite directions to open or close the valve, a support for the motor, reduction gearing adapted to be rendered operative to transmit the rotation of the motor shaft to the hand-wheel said gearing including an annular gear wheel carried at one side of the hand-wheel, a limit switch for stopping the motor when the valve spindle has reached the limit of its valve opening or valve closing movement, and a housing member secured to the motor support within which the reduction gearing and limit switch are mounted, said housing member and said hand-wheel together with the annular gear carried thereby being constructed and arranged to cooperate to entirely enclose the parts mounted therewithin.

9. A power unit for gate valves having, in combination, a rotatable member connected to actuate the valve, driving means for said member, including a hand wheel carried by said rotatable member, an annular gear formed at one side of the hand-wheel and provided with internal gear teeth, a motor for driving said gear, reduction gearing between the motor and said gear, means for detachably operatively connecting said annular gear and said motor, and a housing member cooperating with said gear and hand-wheel to enclose said gearing.

10. A power unit for gate valves having, in combination, a rotatable member connected to actuate the valve, driving means for said member, including a hand-wheel carried by said rotatable member, an annular gear formed at one side of the hand-wheel and provided with internal gear teeth, a motor for driving said gear, reduction gearing between the motor and said gear, means for displacing said reduction gearing for rendering same inoperative, and a housing member cooperating with said gear and hand-wheel to enclose said gearing.

11. In a power transmission unit, in combination with a valve operating rod, a driving shaft, means for moving said valve operating rod including a housing having two parts, one of which is a moving part provided with internal gear teeth, means carried by the moving part of the housing for connecting the valve operating rod thereto, reduction gearing engaged with said gear teeth, said means for connecting the valve operating rod and housing, and said reduction gearing being entirely contained in the compartment afforded by the parts of said housing.

12. In a power transmission unit, in combination with a valve operating rod, a driving shaft, means for moving said valve operating rod including a housing having two parts, one of which is a moving part provided with internal gear teeth, means carried by the moving part of the housing for connecting the valve operating rod thereto, reduction gearing engaged with said gear teeth, said means for connecting the valve operating rod and housing, and said reduction gearing being entirely contained in the compartment afforded by the parts of said housing, and means for displacing said reduction gearing with respect to said internal gear.

13. In a power transmission unit, in combination with a valve operating rod, a driving shaft, means for moving said valve operating rod including a housing having two parts, one of which is a moving part provided with internal gear teeth, means carried by the moving part of the housing for connecting the valve operating rod thereto, reduction gearing engaged with said gear teeth, said means for connecting the valve operating rod and housing, and said reduction gearing being entirely contained in the compartment afforded by the parts of said housing, a standard for supporting said housing, and a motor mounted upon said standard externally of the housing, and connected to said valve operating rod through the moving part of said housing.

14. In motion transmitting apparatus, a standard having a casing at one end thereof having relatively movable parts, a driven element in said casing, transmission mechanism, the parts of said casing forming a compartment enclosing said power transmission mechanism, a part of said casing forming a moving part of said transmission mechanism, and a motor mounted externally of the casing directly on said standard and having a shaft extended into the casing and connecting said motor and said transmission mechanism through the moving part of said casing.

15. In motion transmitting apparatus, a standard having a casing supported thereby, a movable element, forming a part of the casing, a driving motor supported externally of the casing upon said standard and at one side thereof, and power transmission mechanism in the casing connecting said motor and movable element.

16. In a motion transmitting apparatus, a unit device comprising a standard, a casing supported thereby, an element to be driven in said casing, a motor, transmission mechanism for operative detachable connection to said element to be driven, manually operable means extending from said casing and movable relatively thereto and to the element to be driven and to said transmission mechanism about the axis of a part of the latter for disconnecting said transmission mechanism from the element to be driven, and auxiliary manual operating means externally of said casing for operating the device when the motor is disconnected.

17. In a motion transmitting apparatus, a unit device including a standard, a casing supported thereby, an element to be driven in said casing and a part of said casing being rotatable with said element to be driven, a motor, gearing connecting said motor and said element to be driven through the rotatable part of said casing, and manually operable means extending from the casing and movable relatively thereto about the axis of a part of said gearing for disconnecting the motor and said element to be driven, and auxiliary manual operating means externally of the casing for operating the device when the motor is disconnected.

18. In motion transmitting apparatus, a standard, a casing mounted upon said standard and containing an element to be driven, said casing having a movable part operatively connected to said element, an external motor mounted on said standard, externally of said standard and casing power transmission mechanism completely housed in the casing and operatively connected to the motor shaft and the movable part of said casing, and auxiliary manual operating means disposed externally of the casing and connected to the movable part of said casing.

19. In motion transmitting apparatus, a standard having a casing at the upper end thereof, said casing including relatively rotatable parts, a driven element in said casing, transmission mechanism in said casing, and including one of the parts of said casing, the parts of the casing forming a compartment entirely enclosing said transmission mechanism, a motor mounted upon said standard externally of the casing, a shaft extending into the casing and connected with said motor and said transmission mechanism through one of the parts of said casing, and means for operatively disconnectibly connecting said transmission mechanism to said driven element.

20. In a motion transmitting apparatus, a unit device comprising a standard, a casing supported thereby and having relatively rotatable enclosing parts, an element to be driven contained in said casing, and transmission mechanism having operative connection with said element, one of the relatively movable parts of said casing being rotatable with the element to be driven and forming an auxiliary manual operating means, the parts of said casing cooperating and forming a compartment entirely enclosing said transmission mechanism, an external motor mounted on said standard and operatively connected to and for driving the rotatable part of said casing which forms the manual operating means.

21. In motion transmitting apparatus, a unit device comprising a standard, a casing having two relatively movable parts supported on said standard, an element to be driven in said casing, transmission mechanism having operative connection with said element, a part of said casing being rotatable with said element to be driven and forming an auxiliary manual operating means, a motor mounted externally of said casing, and a disconnectible reduction gearing connecting the motor and transmission mechanism the parts of said casing forming a compartment entirely enclosing said transmission mechanism, gearing, and element to be driven.

22. A power driven operating unit for valves and the like, including a standard, a housing supported thereby and having relatively movable parts, a valve operating mechanism in said housing, and a motor carried by said standard and having a disconnectible driving connection with said operating mechanism, the parts of said housing cooperating to form a compartment containing said operating mechanism and connection, a part of said housing forming a moving part of said mechanism and manual operating means therefor.

In testimony whereof I have affixed my signature.

EMORY T. SMITH.